United States Patent [19]
Fujisaki et al.

[11] Patent Number: 5,457,998
[45] Date of Patent: Oct. 17, 1995

[54] METHOD OF DETECTING AN OPTICAL TRANSMISSION LINE

[75] Inventors: Akira Fujisaki, Ichikawa; Kazunori Nakamura, Yokohama, both of Japan

[73] Assignee: The Furukawa Electric Co., Ltd., Tokyo, Japan

[21] Appl. No.: 30,202

[22] PCT Filed: Aug. 3, 1992

[86] PCT No.: PCT/JP92/00987

§ 371 Date: Mar. 25, 1993

§ 102(e) Date: Mar. 25, 1993

[87] PCT Pub. No.: WO93/03400

PCT Pub. Date: Feb. 10, 1993

[30] Foreign Application Priority Data

Aug. 2, 1991 [JP] Japan ................................. 3-216345

[51] Int. Cl.[6] ............................. G01S 1/76; G01S 5/26
[52] U.S. Cl. ............................. 73/657; 73/432.1; 73/DIG. 1
[58] Field of Search ..................... 73/655, 657, 432.1, 73/DIG. 1, 618, 643; 181/125

[56] References Cited

U.S. PATENT DOCUMENTS 4,405,198  9/1983  Taylor ............................ 73/655
4,956,550  9/1990  Edwards et al. ............... 250/227.15
5,006,806  4/1991  Rippingale et al. ............... 324/326

FOREIGN PATENT DOCUMENTS 60-203821  10/1985  Japan .
62-52419   3/1987   Japan .
1-096583   4/1989   Japan .
4-190122   7/1992   Japan .

Primary Examiner—Hezron E. Williams
Assistant Examiner—Rose M. Finley
Attorney, Agent, or Firm—Jacobson, Price, Holman & Stern

[57] ABSTRACT

A method of detecting an underground optical transmission line effectively and efficiently regardless if the optical transmission line is of a non-metallic type or not. The method comprises steps of emitting acoustic vibration from vibration generating means toward an underground area where the optical transmission line 1 is laid while moving the vibration generating means on a road roller 5 on the ground and measuring changes in the intensity of an optical signal being transmitted through the optical transmission line 1 subjected to the vibration and the displacement of the vibration generating means to determine the location of the underground optical transmission line 1 from the distribution of the intensity of the transmitted optical signal.

10 Claims, 3 Drawing Sheets

METHOD OF DETECTING AN OPTICAL TRANSMISSION LINE

BACKGROUND OF THE INVENTION

1. Field of Invention

This invention relates to a method of detecting a particular underground optical transmission line from the surface of the ground.

2. Prior Art

In modern telecommunication systems, optical cables are laid along the route of installation directly or housed in a duct or conduit which is lying underground.

Typical underground optical telecommunication networks comprise central stations, relay stations and terminal stations interconnected by means of a large number of optical transmission lines, which are often ramified, looped and star-connected.

There often arises cases where a particular underground optical transmission line needs to be branched, moved, tested, repaired and replaced.

Then, the particular underground optical transmission line has to be detected and dug out from the surface.

Since the routes of underground optical transmission lines are documented, it is normally not difficult to roughly trace the route of a particular transmission line from the ground surface and select a site for digging out the line. However, tremendous efforts may be required to precisely locate a particular transmission line at the work site simply because it is not visible from the surface. An old and conventional method to alleviate such efforts is to put a sign, or indicator, on the ground, telling that one or more than one optical transmission lines are buried there.

As more and more underground optical transmission lines are laid to form large networks, however, installation of such signs will become costly and, in some cases, may constitute obstacles for traffic on the ground.

Additionally, such indicators will eventually become damaged, degraded and inoperative as they are exposed to the atmosphere for a prolonged period of time.

In short, the use of signs does not provide an effective way for detecting underground optical transmission lines and is accompanied by a problem of necessity of digging the ground over a large area to take out a single transmission line. If an excavator machine is used to efficiently dig the ground over a large area, it can accidentally destroy transmission lines and/or other underground installations.

It should be noted here that an underground optical transmission line comprising an electric conductor or a metallic component can be precisely located by sending an electric signal into the conductor and detecting from the ground surface the electromagnetic wave generated by the conductor according to the electric signal.

As this technique is effective only for optical transmission lines comprising a conductor, the use of the technique will inevitably be very limited under the current circumstances where non-metallic optical transmission lines are more and more prevalent in optical telecommunication systems.

SUMMARY OF THE INVENTION

In view of the above discussed technological problems, it is therefore an object of the present invention to provide a method of accurately and efficiently detecting a underground optical transmission line regardless if it is a dielectric type or not.

According to the invention, the above object is achieved by providing a method of detecting an underground optical transmission line comprising steps of emitting acoustic vibration from vibration generating means toward an underground area where the optical transmission line is laid while moving the vibration generating means on the ground and measuring changes in the intensity of an optical signal being transmitted through the optical transmission line subjected to the vibration and the displacement of the vibration generating means to determine the location of the underground optical transmission line from the distribution of the intensity of the transmitted optical signal.

The method of detecting an optical transmission line according to the invention can be used to detect not only a particular optical transmission line contained in an optical cable but also an optical line buried underground integrally with or in parallel with another underground utility installation such as a water supply pipe, a sewer pipe or a gas supply pipe.

According to an aspect of the present invention, an optical transmission line is searched two-dimensionally in the first step by using any given two different horizontal directions to determine a spot from which the ground is to be dug and thereafter it is vertically searched to determine the depth to which the ground is dug to reach the line.

According to a particularly advantageous aspect of the present invention, the state of polarization of the signal running through the optical transmission line to be detected is modulated to change the intensity of the output signal or tile optical coupling coefficient is modulated at the output terminal of tile optical transmission line to change the intensity of the output signal of the transmission line.

According to another aspect of the invention, a single mode type optical fiber comprised in the optical transmission line to be detected can advantageously be used for tile detection.

According to still another aspect of the invention, a multi-mode type optical fiber comprised in the optical transmission line to be detected can advantageously be used for the detection when the multi-mode type optical fiber is connected to a single mode type optical fiber at the output terminal thereof.

When such is the case, the speckle pattern produced at the connection of the multi-mode type optical fiber and the single mode type optical fiber is varied to change tile intensity of the output signal of the multi-mode type optical fiber of the optical transmission line.

When a single mode type optical fiber comprised in an optical transmission line to be detected is used for the detection, a technique of light wave control utilizing acoustic optical phenomena (ultrasonic polarization or modulation) can be employed such that a vibration signal is applied to the signal light being transmitted along the single mode type optical fiber from the outer peripheral surface of the optical fiber to translate any changes in the signal light into corresponding changes in the polarization of the light.

Then, the signal light is caused to have a frequency same as that of the applied vibration signal and an intensity proportional to that of the applied vibration signal.

If vibration is emitted toward the underground optical transmission line to be detected from the surface of the ground for light wave control, although it attenuates as it is transmitted through the ground, the intensity of the vibration signal applied to the signal light in a single mode type optical fiber of the optical transmission line and, therefore, that of the output signal light of the single mode type optical fiber whose state of polarization is modulated is also maximized when the source of vibration approaches closest to (and right above) the optical transmission line.

Thus, according to the method of the present invention, a particular underground optical transmission line can be detected simply by emitting a vibration signal from moving vibration generating means toward the underground optical transmission line to be detected in order to find out a spot where the intensity of the signal light being transmitted through a single mode type optical fiber of the optical transmission line is maximized. Then, the optical transmission line is located right below the spot of the vibration generating means.

When a multi-mode type optical fiber comprised in an optical transmission line to be detected is used for the detection, the output terminal of the fiber is connected to a single mode type optical fiber and then vibration is applied to the multi-mode type optical fiber so that interference of light among the different modes of the multi-mode type optical fiber caused by the vibration applied to the multi-mode type optical fiber may be utilized for the detection.

As vibration is applied to the multi-mode type optical fiber under such conditions, there arises interference of signal light among the different modes of the multi-mode type optical fiber that are transmitting the signal light at the connection of the multi-mode type optical fiber and the single mode type optical fiber to produce a speckle pattern on the cross section of the core of the multi-mode type optical fiber, indicating that, the intensity of light is not evenly distributed in the multi-mode type optical fiber.

While the pattern of interference of light may be changed by external disturbances other than the vibration applied to the multi-mode type optical fiber, it may most conspicuously show changes when a vibration signal is applied thereto from moving vibration generating means on the ground.

When such changes are observed at a point on the core of the multi-mode type optical fiber, the intensity of the signal light will vary as a function of the frequency of the applied vibration signal.

Additionally, such changes can be expressed by a signal representing changes in the intensity of light that occur in the single mode type optical fiber connected to the multi-mode type optical fiber as a function of the frequency of the applied vibration signal.

Thus, by translating the signal representing changes in the intensity of light into a signal representing modulation of the state of polarization of the light signal being transmitted through the optical fiber, an optical transmission line comprising single mode type optical fibers can be detected as easily as an optical transmission line comprising single mode type optical fibers.

BEST MODES OF CARRYING OUT THE INVENTION

Figure 1A:
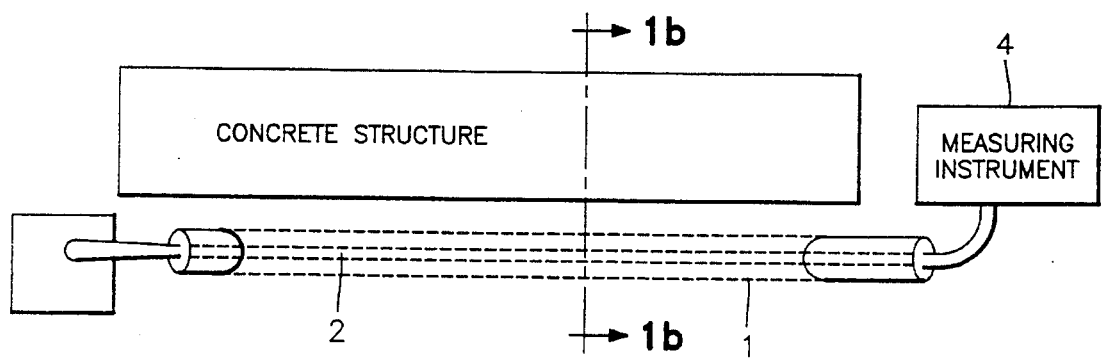
FIG. 1(a) is a plan view of a situation where the method of the present invention is used to detect an underground optical transmission line.
Figure 1B:
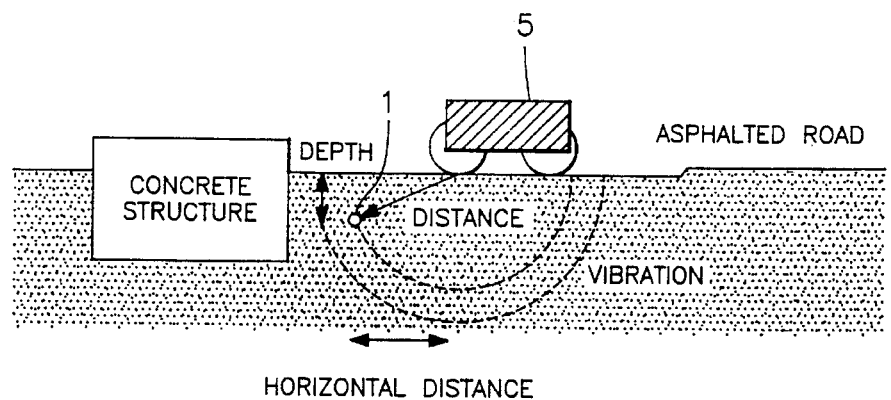
FIG. 1(b) is a sectional view cut along X—X line of FIG. 1(a).

FIGS. 1(a) and 1(b) illustrate a typical situation where the method of the present invention is used to detect an underground optical transmission line.

FIGS. 1(a) and 1(b), the optical transmission line 1 is in fact a double core SZ-type optical cable comprising a pair of single mode type optical fibers 2.

The optical transmission line 1 is approximately 100 m long and is laid underground in a bare state at a depth of 750 mm from the surface.

As shown in FIG. 1(a), the single mode type optical fibers 2 of the optical transmission line 1 are drawn out of the optical transmission line 1 at both ends.

More specifically the left ends of the single mode type optical fibers 2 in FIG. 1(a) are interconnected to from a loop, while the right or opposite ends of the single mode type optical fibers 2 are connected to a measuring instrument 4.

Thus, when extended, the total length of the single mode type optical fibers 1 will be approximately 250 m including the portions thereof drawn out of the optical transmission line 1.

Figure 4:
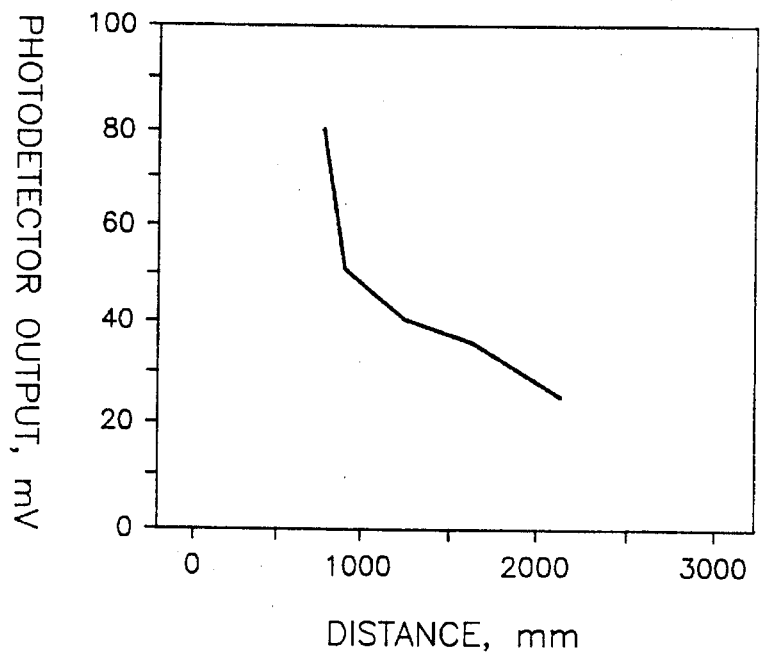
FIG. 4 is a graph showing the relationship between the distance from a source of vibration to an optical transmission line and the intensity of the output signal light of the transmission line modulated by the vibration.

As shown in FIG. 4, the measuring apparatus 4 comprises a light source 6, an analyzer 7, a photodetector 8, a O/E converter 9 and an oscilloscope.

An LD of any known type having a high degree of coherency is used for the light source 6 to shed light into each of the single mode type optical fibers 2 of the optical transmission line 1. The analyzer 7, the photodetector 8, the light/electricity transducer 9, the oscilloscope 10 may be of any known types.

The analyzer 7 is so adjusted as to maximize the intensity of signal light having a changing state of polarization. The level of the light emitted from the light source is −0.7 dBm at the point of emission, while that of the light at the point of reception of the photodetector 8 is approximately −0.62 dBm.

The oscilloscope 10 observes the output of the light/electricity transducer 9 and records the result of observation.

Figure 2:
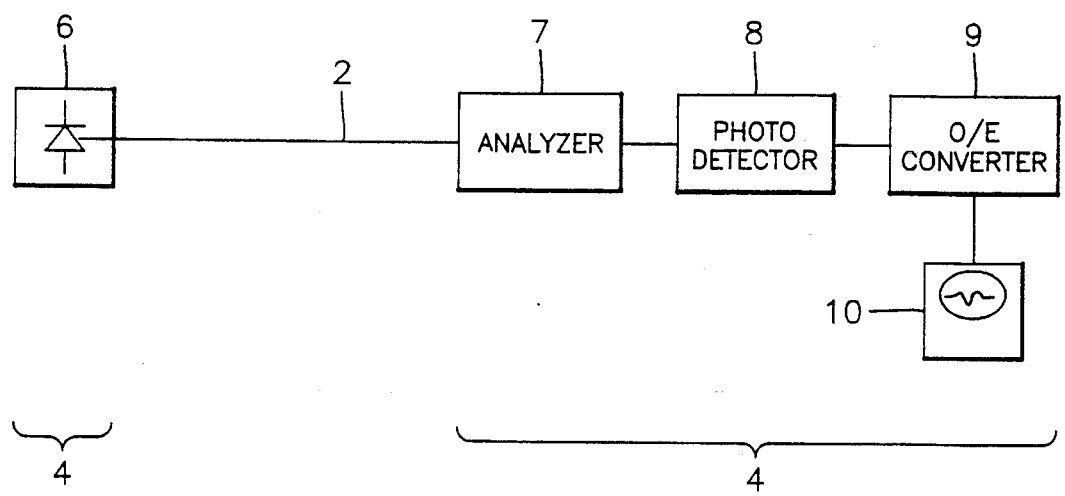
FIG. 2 is a block diagram of an optical detection system to be used for the method of the present invention.

In FIG. 2, there is provided a road roller 5 that carries on it a vibration generating apparatus (not shown) for transmitting vibration toward underground.

The vibration generating apparatus comprises a source of ultrasonic vibration or any other form of mechanical vibration.

In an experiment conducted by the inventor of the present invention in a situation as illustrated in FIGS. 1(a) and 1(b) where an optical transmission line 1 is laid underground, a road roller 5 carrying a vibration generating apparatus was made to run on the ground above and near the route of the optical transmission line 1 and the vibration generating apparatus on it was caused to transmit vibration having a frequency of approximately 55 Hz.

The optical transmission line 1 comprised a pair of single mode type optical fibers 2, through each of which signal light was being transmitted.

Figure 3:
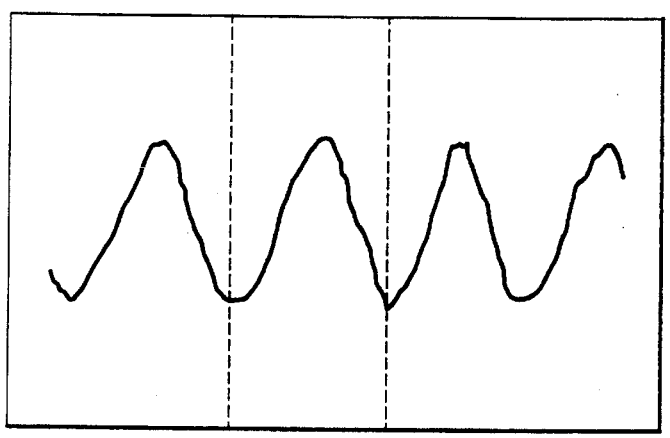
FIG. 3 is a graph showing the waveform of an output signal modulated by applying vibration according to the method of the present invention.

The output signal light of the photodetector 8 was then converted into an electric signal by the O/E converter 9 to obtain a waveform having a frequency same as that of the applied vibration on the screen of the oscilloscope 10 as illustrated in FIG. 3.

The intensity of the modulated output signal does not represents an absolute value.

More specifically, the intensity of the output signal is a relative value expressed as a function of various conditions of signal transmission, where the relationship between the distance from the source of vibration to the optical transmission line 1 and the amplitude of the intensity, or the voltage, of the output signal is illustrated by the graph of FIG. 4.

It is obvious from FIG. 4 that the vibration emitted toward the underground optical transmission line 1 from the surface of the ground was very effective for detecting the transmission line.

In other words, the vibration emitted downward from a spot on the ground surface right above the optical transmission line 1 laid underground in a bare state remarkably amplified the intensity of the signal light running through the transmission line and having a changing state of polarization and consequently the optical transmission line 1 (object of detection) could be easily and accurately detected.

So, it will be clear by now that, when the signal light running through the underground optical transmission line 1 was subjected to vibration emitted from the surface of the ground, it sensitively responded to the vibration to change the state of polarization and so an optical transmission line 1 can be detected by utilizing this effect of acoustic vibration on signal light running through an underground optical transmission line that becomes apparent when it, is applied to the optical transmission line from the surface of the ground.

Figure 5:
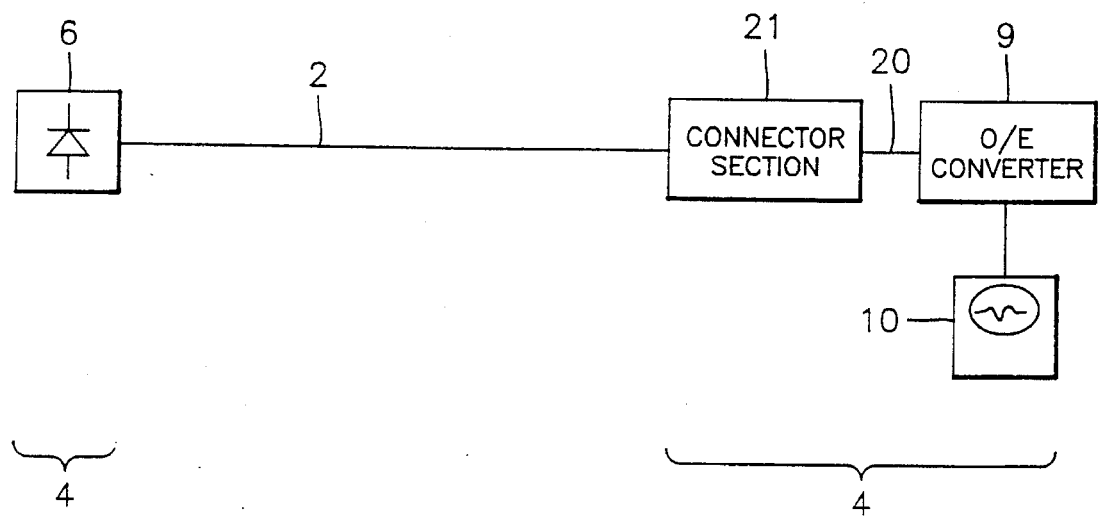
FIG. 5 is a block diagram similar to FIG. 2 but showing the configuration of an alternative optical detection system to be used for the method of the present invention.

FIG. 5 shows a block diagram similar to FIG. 2 but showing the configuration of an alternative optical detection system to be used for the method of the present invention.

This optical detection system can be used for an optical transmission line 1 comprising multi-mode optical fibers (GI) 22, each of which is connected at an end to a single mode type optical fiber (SM) 20 by an connector section 21 disposed between the GI optical fiber and the SM optical fiber.

With an arrangement as described above, the speckle pattern that appears at the connector section 21 changes between the multi-mode type optical fiber and the single mode type optical fiber to change the intensity of the signal light sent out from the multi-mode type optical fiber. So the optical transmission line 1 can be located by detecting the changes in the intensity of the signal light.

An underground optical transmission line 1 can be three-dimensionally expressed in-terms of longitudinal axis (y-axis), transversal axis (x-axis) and vertical axis (z-axis) of a rectangular coordinate system.

In view of such a coordinate system, an optical transmission line 1 is located only two-dimensionally (in terms of x- and y-axes) by any of the above described optical detection systems.

The method of the present invention, however, can be used to locate an optical transmission line 1 not only two-dimensionally but also in terms of the depth (z-axis) at which the optical transmission line 1 laid underground in a roamer similar to the one as described above.

Assuming that an underground optical transmission line 1 has been located two-dimensionally in terms of x- and y-axes and now an excavator is used to dig out the optical transmission line 1. Then an optical detection system to be used with the method of the present invention is fitted to or disposed close to the excavator so that vibration can be emitted from the vibration generating apparatus of the system toward the optical transmission line 1, while the excavator is digging the ground near the optical transmission line 1.

As the excavator digs the ground deeper, the optical detection system comes close to the optical transmission line 1 and the intensity of the signal light being transmitted from the optical transmission line and received by the optical detection system will be grow accordingly.

More specifically, as the intensity of the signal light received by the optical detection system is increased inversely proportionally to the distance between the optical transmission line 1 and the excavator and, therefore, the optical detection system disposed on or near the excavator, the depth at which the optical transmission line 1 is laid underground can be determined by observing the varying intensity of the signal light as a function of the distance from the optical detection system or the excavator.

Thus, if an optical detection system as described above is used with an excavator digging the ground to expose an optical transmission line, the optical transmission line 1 can be dug out without being damaged by the excavator.

The method of detecting an optical transmission line according to the invention can be used for locating an optical transmission line in the form of one or more than one optical fibers, optical cords or optical cables buried underground integrally with or in parallel with another underground utility installation such as a water supply pipe, a sewer pipe or a gas supply pipe made of synthetic resin (FRP), ceramic or concrete in a manner as described above.

INDUSTRIAL APPLICABILITY

As described above in detail, with the method of detecting an optical transmission line according to the invention, vibration generating means emits acoustic vibration toward an underground area where the optical transmission line is laid while the vibration generating means is moved on the ground and changes in the intensity of an optical signal being transmitted through the optical transmission line and subjected to the vibration are measured to determine the location of the underground optical transmission line from the distribution of the intensity of the transmitted optical signal as a function of the displacement of the vibration generating means. Thus, the underground optical transmission line can be effectively and efficiently detected regardless if the optical transmission line is of a non-metallic type or not.

What is claimed is:

1. A method of detecting an underground optical transmission line, comprising emitting acoustic vibration from a vibration generating means toward an underground area where the optical transmission line is buried, moving the vibration generating means on the ground, measuring changes in the intensity of an optical signal being transmitted through the optical transmission line subjected to the vibration, and displacing the vibration generating means to determine the location of the underground optical transmission line from a distribution of the intensity of the transmitted optical signal.

2. A method of detecting an optical transmission line according to claim 1, wherein said underground optical transmission line is buried integrally with another underground utility installation.

3. A method of detecting an optical transmission line according to claim 1, wherein said underground optical transmission line is buried in parallel with another underground utility installation.

4. A method of detecting an optical transmission line according to claim 1, wherein said optical transmission line is detected by two-dimensionally locating said optical transmission line in terms of two different horizontal directions from the ground surface.

5. A method of detecting an optical transmission line according to claim 1, wherein said optical transmission line is detected by vertically locating said optical transmission line from the ground surface.

6. A method of detecting an optical transmission line according to claim 1, wherein a state of polarization of a signal applied to the optical transmission line to be detected is modulated to change the intensity of an output signal 7. A method of detecting an optical transmission line according to claim 1, wherein an optical coupling coefficient is modulated at the output terminal of the optical transmission line to change the intensity of an output signal of the transmission line to be detected.

8. A method of detecting an optical transmission line according to claim 1, wherein a single mode optical fiber in the optical transmission line to be detected is used for the detection.

9. A method of detecting an optical transmission line according to claim 1, wherein a multi-mode optical fiber in the optical transmission line is used for the detection and connected at a terminal thereof with a single mode optical fiber.

10. A method of detecting an optical transmission line according to claim 9, wherein a speckle pattern appearing at the connection of the multi-mode optical fiber and the single mode optical fiber is varied to change the intensity of the output signal of the multi-mode optical fiber of the optical transmission line.

* * * * *